United States Patent
Schelhaas et al.

(10) Patent No.: US 9,079,177 B2
(45) Date of Patent: Jul. 14, 2015

(54) METHYLENE AMINOETHYL SULFONIC ACID CHELATING RESINS

(75) Inventors: Michael Schelhaas, Köln (DE); Pierre Vanhoorne, Monheim (DE); Reinhold Klipper, Köln (DE); Georg Martin, Langenfeld (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 420 days.

(21) Appl. No.: 13/512,033

(22) PCT Filed: Dec. 2, 2010

(86) PCT No.: PCT/EP2010/068747
§ 371 (c)(1),
(2), (4) Date: Feb. 15, 2013

(87) PCT Pub. No.: WO2011/067340
PCT Pub. Date: Jun. 9, 2011

(65) Prior Publication Data
US 2013/0139649 A1    Jun. 6, 2013

(30) Foreign Application Priority Data
Dec. 4, 2009   (EP) .................................... 09178036

(51) Int. Cl.
*B01J 45/00*    (2006.01)
*C08F 28/02*    (2006.01)

(52) U.S. Cl.
CPC . *B01J 45/00* (2013.01); *C08F 28/02* (2013.01)

(58) Field of Classification Search
USPC .................... 521/38, 147; 210/688; 525/333.5
See application file for complete search history.

(56) References Cited

U.S. PATENT DOCUMENTS 4,403,065 A * 9/1983 Yoshioka et al. ............. 524/816

FOREIGN PATENT DOCUMENTS

JP    2004051789    * 2/2004    .................. B41J 2/01

OTHER PUBLICATIONS

Derwent Acc No. 2004-366985 for the Patent Family Including JP 2004051789 Published Feb. 19, 2004 by Kato, E.*
Machine Translation of JP 2004051789 Published Feb. 19, 2004 by Kato, E.*
Hering, R., Chelatbildende Ionentauscher, Akademie Verlag, Berlin 1967, pp. 150-157.
International Search Report from co-pending Application PCT/EP2010068747 dated Apr. 2, 2011 2 pages.

* cited by examiner

*Primary Examiner* — Kara Boyle

(57) ABSTRACT

The present invention relates to chelating resins containing methyleneaminoethylsulfonic acid groups, a process for producing them and also their use for removing heavy metals or metals of value from aqueous solutions having a pH of <4, preferably from process water in or from the electronics industry, the electroplating industry or the mining industry.

17 Claims, No Drawings

METHYLENE AMINOETHYL SULFONIC ACID CHELATING RESINS

The present invention relates to chelating resins containing methyleneaminoethylsulfonic acid groups, a process for producing them and also their use for removing heavy metals from liquids, preferably process water in or from the electronics industry, the electroplating industry and the mining industry.

Ion exchangers have for a long time been used for removing metals of value and heavy metals, preferably tin, cobalt, nickel, copper, zinc, lead, uranium, bismuth, vanadium, elements of the platinum group, preferably ruthenium, osmium, iridium, rhodium, palladium, platinum, and noble metals, preferably gold and silver, from, in particular, aqueous solutions. Cation or anion exchangers and also chelating resins are preferably used for this purpose.

The use of chelating resins for removing heavy metals or metals of value is known to those skilled in the art and is described, for example, in R. Hering, Chelatbildende Ionentauscher, Akademie Verlag, Berlin, 1967, pages 150 to 157. Mention is made, inter alia, of chelating resins having iminodiacetic acid groups (IDE groups).

In EP-A 1078690, chelating resins having iminodiacetic acid groups or aminomethylphosphonic acid groups for the selective absorption of heavy metals are prepared by the phthalimide process. According to U.S. Pat. No. 4,444,961, chelating resins having iminodiacetic acid groups can also be prepared by the chloromethylation process.

U.S. Pat. No. 4,098,867 and U.S. Pat. No. 4,031,038 describe chelating resins bearing methylaminopyridine groups.

In many cases, chelating resins display a significantly higher selectivity for heavy metals than, for example, cation exchangers having strongly acidic sulfonic acid groups.

Conventional chelating resins absorb heavy metals from aqueous solutions at pH>4. At pH values below about 4, the selectivity of conventional chelating resins for heavy metals decreases since their functional groups are protonated.

In many processes for winning heavy metals from metal ores, rock is treated with sulfuric acid. The heavy metals are dissolved from the rock and are present in the strongly acidic rock-sulfuric acid suspension. The removal of heavy metals from solutions or suspensions having strongly acidic pH values in the range from about 4 to about 0 is therefore of considerable industrial interest.

Ion exchangers which can absorb metals of value selectively from acidic solutions or suspensions in the pH range from 4 to about 0 are sought.

Most metal ores contain not only one but many metals of value in different concentrations. Owing to the great variety of metal ores and the wide variety of metal compositions associated therewith, it is desirable to have many types of ion exchangers having different selectivities in order to extract the desired metal of value as selectively as possible from the mixture of metals of value.

However, up to now only a handful of chelating resins which all have an intrinsic selectivity due to their functional groups have been commercially available.

Further chelating resins which have new functional groups and can be prepared on an industrial scale are therefore sought.

It was therefore an object of the present invention to provide a highly functionalized, high-capacity chelating resin which is stable even at low pH values and has a new functional group which effectively adsorbs metals of value from acidic aqueous solutions.

It has now surprisingly been found that such resins can be prepared by reacting aminomethylated bead polymers with vinylsulfonic acid.

The object is achieved by and the present invention therefore provides chelating resins containing methyleneaminoethylsulfonic acid groups of the general formula (I)

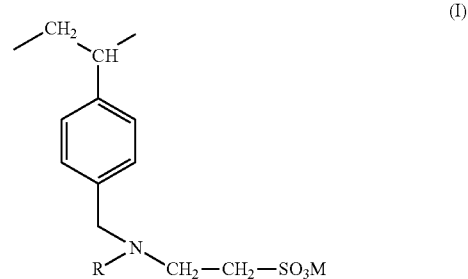

where
R is a radical from the group consisting of —H, —$C_1$-$C_6$-alkyl, —$CH_2$—COOM or —$CH_2$—$CH_2$—$SO_3$M and
M is H or a metallic cation, preferably a cation of the alkali metal group, in particular $Na^+$ or $K^+$.

The present invention also provides a process for preparing chelating resins containing methyleneaminoethylsulfonic acid groups of the general formula (I)

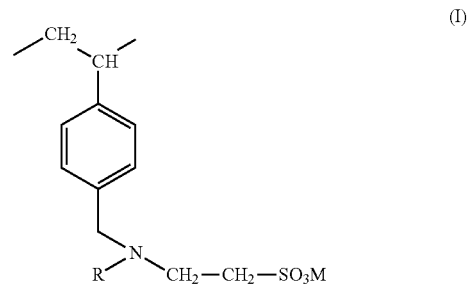

where
R is a radical from the group consisting of —H, —$C_1$-$C_6$-alkyl, —$CH_2$—COOM or —$CH_2$—$CH_2$—$SO_3$M and
M is H or a metallic cation, preferably a cation of the alkali metal group, in particular $Na^+$ or
characterized in that
a) a monoethylenically unsaturated aromatic monomer and a multiethylenically unsaturated compound are polymerized in the presence of a pore former to give a bead polymer,
b) the bead polymer is converted into an aminomethylated bead polymer,
c) the aminomethylated bead polymer is washed until neutral,
d) the aminomethylated bead polymer is reacted with vinylsulfonic acid and
e) the chelating resin containing methyleneaminoethylsulfonic acid groups which is obtained after the reaction is washed with deionized water at temperatures of from 20 to 120° C. and isolated by being allowed to settle or filtration.

To prepare the chelating resins of the invention, preference is given to firstly producing unfunctionalized bead polymers by suspension polymerization of unfunctionalized monomers and providing these with the chelating methyleneaminoethylsulfonic acid structure in one or more subsequent step(s).

As unfunctionalized monomers, preference is given to using monoethylenically unsaturated aromatic monomers, particularly preferably styrene, α-methylstyrene, vinyltoluene, t-butylstyrene or vinylnaphthalene. Mixtures of these monomers and mixtures of monoethylenically unsaturated aromatic monomers with up to 20% by weight of other monoethylenically unsaturated monomers, preferably chlorostyrene, bromostyrene; acrylonitrile, methacrylonitrile, esters of acrylic acid or methacrylic acid, particularly preferably methyl methacrylate, ethyl methacrylate, methyl acrylate, ethyl acrylate, isopropyl methacrylate, butyl acrylate, butyl methacrylate, hexyl methacrylate, 2-ethylhexyl acrylate, ethylhexyl methacrylate, decyl methacrylate, dodecyl methacrylate, stearyl methacrylate, or isobornyl methacrylate; ethers and esters of vinyl alcohol, preferably vinyl acetate, ethyl vinyl ether, propyl vinyl ether, butyl vinyl ether, butanediol monovinyl ether, ethylene glycol monovinyl ether or diethylene glycol monovinyl ether, are also well suited. In particular, styrene or vinyltoluene are preferably used, very particularly preferably styrene.

Crosslinkers are mixed into the monomers. Preferred crosslinkers are multiethylenically unsaturated compounds. Particular preference is given to divinylbenzene, divinyltoluene, trivinylbenzene, ethylene glycol dimethacrylate, ethylene glycol diacrylate, ethylene glycol divinyl ether, diethylene glycol divinyl ether, butanediol divinyl ether, octadiene and triallyl cyanurate. Very particular preference is given to using divinylbenzene and trivinylbenzene, especially divinylbenzene. The crosslinkers can be used either alone or as a mixture of various crosslinkers. The total amount of crosslinkers to be used is generally from 0.1 to 80% by weight, preferably from 0.5 to 60% by weight, particularly preferably from 1 to 40% by weight, based on the sum of the ethylenically unsaturated compounds.

In a preferred embodiment of the present invention, at least one pore former, known as a porogen, is added to the monomers to produce a pore structure in the unfunctionalized bead polymer. Preference is given to using organic diluents as porogens. Particular preference is given to using organic diluents which dissolve in water to an extent of less than 10% by weight, preferably less than 1% by weight. Particularly suitable porogens are toluene, ethylbenzene, xylene, cyclohexane, octane, isooctane, decane, dodecane, isododecane, methyl isobutyl ketone, ethyl acetate, butyl acetate, dibutyl phthalate, n-butanol, 4-methyl-2-pentanol and n-octanol. Very particular preference is given to toluene, cyclohexane, isooctane, isododecane, 4-methyl-2-pentanol or methyl isobutyl ketone.

It is also possible to use mixtures of the abovementioned pore formers as porogen.

The porogen is, if added, used in amounts of from 10 to 200% by weight, preferably from 25 to 150% by weight, particularly preferably from 40 to 100% by weight, in each case based on the sum of the ethylenically unsaturated compounds.

In the preparation of the unfunctionalized bead polymers, the abovementioned monomers are, in a preferred embodiment of the present invention, polymerized in the presence of a dispersant using an initiator in aqueous suspension.

As dispersants, preference is given to using natural or synthetic water-soluble polymers. Particular preference is given to using gelatins, starches, polyvinyl alcohol, polyvinyl pyrrolidone, polyacrylic acid, polymethacrylic acid or copolymers of acrylic acids, methacrylic acids, acrylic esters or methacrylic esters. Very particular preference is given to using gelatins or cellulose derivatives, in particular cellulose esters or cellulose ethers such as carboxymethylcellulose, methylcellulose, hydroxyethylcellulose or methylhydroxyethylcellulose. If a dispersant is used, the amount thereof used is generally from 0.05 to 1%, preferably from 0.1 to 0.5%, based on the aqueous phase.

In a further preferred embodiment of the present invention, initiators are used. Suitable initiators are compounds which form free radicals when the temperature is increased. Preference is given to using peroxy compounds, particularly preferably dibenzoyl peroxide, dilauryl peroxide, bis(p-chlorobenzoyl)peroxide, dicyclohexyl peroxydicarbonate and tert-amylperoxy-2-ethylhexane, and also azo compounds, particularly preferably 2,2'-azobis(isobutyronitrile) or 2,2'-azobis(2-methylisobutyronitrile), or aliphatic peroxy esters, preferably tert-butyl peroxyacetate, tert-butyl peroxyisobutyrate, tert-butyl peroxypivalate, tert-butyl peroxyoctoate, tert-butyl peroxy-2-ethylhexanoate, tert-butyl peroxyneodecanoate, tert-amyl peroxypivalate, tert-amyl peroxyoctoate, tert-amyl peroxy-2-ethylhexanoate, tert-amyl peroxyneodecanoate, 2,5-bis(2-ethylhexanoylperoxy)-2,5-dimethylhexane, 2,5-dipivaloyl-2,5-dimethylhexane, 2,5-bis(2-neo-decanoylperoxy)-2,5-dimethylhexane, di-tert-butyl peroxyazelate and di-tert-amyl peroxyazelate.

When initiators are used, they are employed in amounts of from 0.05 to 6.0% by weight, preferably from 0.1 to 5.0% by weight, particularly preferably from 0.2 to 2% by weight, based on the sum of the ethylenically unsaturated compounds.

In a further preferred embodiment, the aqueous phase can contain a buffer system which adjusts the pH of the aqueous phase to a value in the range from 12 to 3, preferably from 10 to 4. Particularly well-suited buffer systems contain phosphate salts, acetate salts, citrate salts or borate salts.

In a further preferred embodiment, it can be advantageous to use an inhibitor dissolved in the aqueous phase. Possible inhibitors include both inorganic and organic materials. Preferred inorganic inhibitors are nitrogen compounds, particularly preferably hydroxylamine, hydrazine, sodium nitrite and potassium nitrite. Preferred organic inhibitors are phenolic compounds, particularly preferably hydroquinone, hydroquinone monomethyl ether, resorcinol, catechol, tert-butylcatechol or condensation products of phenols with aldehydes. Further preferred organic inhibitors are nitrogen-containing compounds, particularly preferably diethylhydroxylamine or isopropylhydroxylamine. Resorcinol is very particularly preferred as inhibitor. The concentration of the inhibitor is 5-1000 ppm, preferably 10-500 ppm, particularly preferably 20-250 ppm, based on the aqueous phase.

The organic phase can be dispersed as droplets in the aqueous phase by stirring (to prepare heterodisperse ion exchangers having a heterodisperse particle size distribution) or by spraying or jetting (to prepare monodisperse ion exchangers having a monodisperse particle size distribution). For the purposes of the present invention, the organic phase is the mixture of monomer(s), crosslinker(s), porogen(s) and optionally initiator(s). In classical dispersion polymerization, the organic droplets are produced by stirring. Stirrer speeds of from 250 to 400 rpm (revolutions per minute) are typically used on the 4 liter scale. If the droplets are produced by spraying, it is advisable to encapsulate the organic droplets in order to maintain the uniform droplet diameter. Methods of microencapsulating sprayed organic droplets are described, for example, in EP-A 0 046 535, whose contents in respect of microencapsulation are incorporated by reference into the present patent application.

EP-A 0 046 535 relates to a process for preparing (monodisperse) bead polymers of uniform particle size and uniform quality, which is characterized in that i) droplets of uniform size are produced from the monomer or polymerization mixture to be polymerized by spraying into a continuously introduced liquid which is essentially not miscible with the monomer or polymerization mixture;

ii) these droplets of uniform size are continuously encapsulated by known methods of microencapsulation in said liquid, either directly with a shell which is stable under the polymerization conditions to be employed or are firstly encapsulated with a shell which is stable to shear forces and this shell which is stable to shear forces is cured continuously or batchwise in a second substep to give a shell which is stable under the polymerization conditions to be employed;

iii) the monomer or polymerization mixture droplets encapsulated with a shell which is stable under the polymerization conditions to be employed are subsequently polymerized, with the proviso α) that the monomer or the polymerization mixture is sprayed into the continuously introduced continuous phase in cocurrent with this continuous phase;

β) that the production of the droplets and the encapsulation thereof are carried out in different regions of the reaction vessel;

γ) that the process steps α) and β) are carried out in such a way that no forces which alter the integrity of the droplets act on the droplets from when they are produced until they are encapsulated.

The encapsulation with a shell which is stable under the polymerization conditions to be employed is carried out in two substeps when the shells produced around the droplets by the microencapsulation method are stable to shear forces but are not stable under the polymerization conditions to be employed.

In this case, the shells have to be cured to form shells which are stable under the polymerization conditions in a second process step which can be carried out continuously or batchwise. The curing step can be carried out in a separate operation in a separate reaction vessel, but is preferably carried out in the same reaction vessel.

If, on the other hand, the shells produced around the droplets by the microencapsulation process are stable under the polymerization conditions to be employed, the curing step is dispensed with and the encapsulation with the shells which are stable under the polymerization conditions to be employed is carried out in one step.

For the purposes of the process described in EP-A 0 046 535, shells are referred to as stable to shear forces when they withstand, without being damaged, stirring movements of an intensity employed in order to produce droplets of equal size under the conditions of conventional suspension polymerizations.

The combination of production of monomer or polymerization mixture droplets of uniform size, stabilization of these droplets by encapsulation and polymerization of the droplets encapsulated with a shell which is stable under the polymerization conditions while maintaining particular conditions gives, according to EP-A 0 046 535, bead polymers whose beads have an approximately equal particle size and uniform physical properties such as particle stability, fracture strength, etc.

The ratio of the organic phase to the aqueous phase is generally from 1:20 to 1:0.6, preferably from 1:10 to 1:1, particularly preferably from 1:5 to 1:1.2.

However, the organic phase can also be added, in the seed-feed process, to a suspension of seed polymers which take up the organic phase, as described in EP-A 0 617 714, whose teaching is incorporated by reference into the present patent application. This method, too, makes it possible to produce monodisperse ion exchangers.

According to EP-A 0 617 714, a number of gel-like copolymer seed particles are provided at the beginning. The seed particles are prepared by polymerization of a first monomer mixture comprising at least one first monovinylidene monomer and a first crosslinking monomer. The seed particles may contain a free radical source which is capable of initiating the polymerization of ethylenically unsaturated monomers.

The seed particles are then subjected to imbibition with a second monomer mixture comprising a phase-separating diluent, at least one second monovinylidene monomer, a second crosslinking monomer and a free-radical polymerization initiator. The free-radical initiator is optional for embodiments in which the seed particles contain a free radical source. The phase-separating diluent and the at least one second monovinylidene monomer are selected so that they have a solubility parameter and a dipole moment which are compatible with the solubility parameter and the dipole moment of the at least one first monovinylidene monomer, so that at least 70% by weight of the second monomer mixture is imbibed by the seed particles.

The imbibed seed copolymer particles are then maintained under suspension polymerization conditions for a time sufficient for a desired degree of conversion of monomer into the copolymer to be achieved and for the porous copolymer beads to be obtained.

The ratio of the sum of organic+seed polymer to the aqueous phase is generally from 1:20 to 1:0.6, preferably from 1:10 to 1:1, particularly preferably from 1:5 to 1:1.2.

The polymerization of the monomers in process step a) according to the invention is preferably carried out at elevated temperature. The polymerization temperature depends on the decomposition temperature of the initiator optionally used in a preferred embodiment and is typically in the range from 50 to 150° C., preferably from 60 to 120° C. The polymerization time is from 30 minutes to 24 hours, preferably from 2 to 15 hours.

At the end of the polymerization, the unfunctionalized bead polymers are separated off from the aqueous phase, for example on a suction filter, and optionally dried.

The average particle size of the bead polymers obtained in process step a) of the process of the invention is 5-1200 μm, preferably 20-1000 μm, particularly preferably from 100 to 1000 μm.

In process step b) according to the invention, the functionalization to form amine-containing bead polymers can be carried out by various methods. Thus, the bead polymers can be converted into amine-containing bead polymers by chloromethylation and subsequent reaction with, for example, hexamethylenetetramine as described in DD 79152 and IL 52121.

A preferred process for converting unfunctionalized polyvinylaromatic bead polymers into amine-containing bead polymers in process step b) according to the invention is the phthalimide process as described in U.S. Pat. No. 4,952,608, DAS 2 519 244 and EP-A 1 078 690, whose teachings in respect of the phthalimide process are incorporated by reference into the present application.

EP-A 1 078 690 relates, for example, to a process for preparing monodisperse ion exchangers having chelating, functional groups, characterized in that l) monomer droplets of at least one monovinylaromatic compound and at least one polyvinylaromatic compound and optionally a porogen and/or optionally an initiator or an initiator combination are converted into a monodisperse, crosslinked bead polymer, m) this monodisperse, crosslinked bead polymer is amidomethylated by means of phthalimide derivatives,
n) the amidomethylated bead polymer is converted into an aminomethylated bead polymer and
o) the aminomethylated bead polymer is reacted to form ion exchangers having chelating groups.

In a preferred embodiment, the unfunctionalized polyvinylaromatic bead polymers from process step a) according to the invention are therefore condensed with phthalimide derivatives. Oleum, sulfuric acid or sulfur trioxide is used as catalyst.

The elimination of the phthalic acid radical and thus the setting-free of the aminomethyl group is carried out by treating the phthalimidomethylated, crosslinked bead polymer with aqueous or alcoholic solutions of an alkali metal hydroxide such as sodium hydroxide or potassium hydroxide at temperatures in the range from 100 to 250° C., preferably 120-190° C. The concentration of sodium hydroxide solution is in the range from 10 to 50% by weight, preferably from 20 to 40% by weight. As an alternative, the phthalic acid radical can be eliminated by treating the phthalimidomethylated, crosslinked bead polymer with hydrazine or hydrazine-containing solutions.

This process makes it possible to prepare cross linked bead polymers containing aminomethyl groups and having a degree of substitution of the aromatic rings of greater than 1.

The aminomethylated bead polymer formed is washed until neutral with deionized water in the process step c) according to the invention.

The conversion of the aminomethylated bead polymer into a chelating resin containing a methyleneaminoethylsulfonic acid structure is carried out in process step d) according to the invention by reacting the aminomethylated bead polymer which has been washed until neutral with vinylsulfonic acid or a salt of vinylsulfonic acid.

Preference is given to alkali metal salts of vinylsulfonic acid, particularly preferably the sodium salt.

The vinylsulfonic acid can be used as pure acid, as pure salt or as a mixture of acid and salt, of acid and various vinylsulfonic acid salts or of various vinylsulfonic acid salts.

In the following, the term vinylsulfonic acid will be used in the interests of simplicity but is intended to include salts thereof. For the reaction of the aminomethylated bead polymer, preference is given to using at least 0.5 mol of vinylsulfonic acid per 1 mol of amine in the aminomethylated bead polymer. Particular preference is given to using a ratio of from 0.8 to 3 mol of vinylsulfonic acid per mol of amine, very particularly preferably from 1.0 to 2 mol of vinylsulfonic acid per mol of amine.

The reaction is preferably carried out in the presence of a suitable solvent. Suitable solvents are those which swell the aminomethylated bead polymer and at the same time dissolve the vinylsulfonic acid to a sufficient extent. Preferred solvents are dimethylformamide, dimethyl sulfoxide, $C_1$-$C_3$-alcohols and water. Particular preference is given to water. It is also possible to use mixtures of the suitable solvents.

The amount of solvent used is not critical to the reaction. It is generally selected so that the mixture remains stirrable during the entire reaction time. Amounts of from 1.2 to 5 ml of solvent per ml of resin have been found to be readily useable.

The temperature at which the reaction is carried out is preferably in the range from room temperature to 150° C. Particular preference is given to employing temperatures in the range from 20 to 120° C., in particular from 50 to 110° C.

The reaction time is generally a number of hours, preferably in the range from 2 to 72 hours, particularly preferably from 4 to 48 hours.

After the reaction, the chelating resin containing methyleneaminoethyl groups which is obtained is, in process step e) according to the invention, washed with deionized water at temperatures of from 20 to 120° C., preferably from 20 to 70° C., and finally isolated by being allowed to settle or filtration.

In a further preferred embodiment of the present invention, the chelating resin containing methyleneaminoethyl groups which is obtained in step e) is modified by further reaction, as follows:
f) the chelating resin obtained in step e) is allowed to react with an alkylating reagent and
g) washed with deionized water at temperatures of from 20 to 120° C. and isolated by being allowed to settle or filtration.

As alkylating reagent in step f), preference is given to using $C_1$-$C_{18}$-alkyl halides, particularly preferably $C_1$-$C_6$-alkyl halides, very particularly preferably methyl chloride, ethyl chloride, methyl bromide, ethyl bromide, n-propyl bromide, 2-propyl bromide, n-butyl bromide, isobutyl bromide, t-butyl bromide and methyl iodide, and also functional alkyl halides, preferably chloroacetic acid, bromoacetic acid, chloropropionic acid, bromopropionic acid, 2-chloroethanol and 2-bromo-ethanol. It is also possible to use other known alkylating compounds, preferably ethylene oxide, ethylene sulfide, dimethyl sulfate, diethyl sulfate and dipropyl sulfate.

Preference is given to using at least 0.5 mol of alkylating reagent per 1 mol of amine in the bead polymer containing methyleneaminoethylsulfonic acid groups in step f). Particular preference is given to using a ratio of from 0.8 to 2 mol of alkylating reagent per mol of amine, very particularly preferably from 1.0 to 1.5 mol of alkylating reagent per mol of amine.

The reaction is carried out in the presence of a suitable solvent. Suitable solvents are those which swell the bead polymer containing methyleneaminoethylsulfonic acid groups and at the same time dissolve the alkylating reagent to a sufficient extent. Preferred solvents are dimethylformamide, dimethyl sulfoxide, $C_1$-$C_3$-alcohols and water. Particular preference is given to $C_1$-$C_3$-alcohols and water. It is also possible to use mixtures of the suitable solvents.

The amount of solvent used is not critical to the reaction. It is generally selected so that the mixture remains stirrable during the entire reaction time. Amounts of from 1.2 to 5 ml of solvent per ml of resin have been found to be readily useable.

The temperature at which the reaction is carried out is preferably in the range from room temperature to 120° C. Particular preference is given to employing temperatures in the range from 20 to 100° C., in particular from 50 to 80° C.

The reaction time is generally a number of hours, preferably from 2 to 72 hours, particularly preferably from 4 to 48 hours.

After the reaction, the resulting alkylated chelating resin containing methyleneaminoethyl groups is, in process step g) according to the invention, washed with deionized water at temperatures of from 20 to 120° C., preferably from 20 to 70° C., and finally isolated by being allowed to settle or filtration.

The inventive chelating resins containing methyleneaminoethyl groups from steps e) or g) have an average particle size D in the range from 100 μm to 1200 μm, preferably from 200 to 1000 μm.

Conventional methods such as sieve analysis or image analysis are suitable for determining the average particle size and particle size distribution. For the purposes of the present invention, the average particle size D is the 50% value (Ø(50))

of the volume-based distribution. The 50% value (Ø (50)) of the volume-based distribution indicates the diameter at which 50% by volume of the particles are smaller.

According to the invention, chelating resins having a monodisperse particle size distribution are preferred. For the purposes of the present invention, monodisperse particle size distributions have a proportion by volume of particles in the range from 0.9 D to 1.1 D of at least 75% by volume, preferably at least 85% by volume, particularly preferably at least 90% by volume.

In a preferred embodiment of the present invention, the chelating resins according to the invention containing methyleneaminoethyl groups have a macroporous structure. For the purposes of the present invention, a macroporous structure is, according to IUPAC (K. Boric et al., Pure and Applied Chemistry 2004, 76(4), 900), a structure having pores having an average diameter of greater than 50 nm. The macroporous, boron-selective resins according to the invention preferably have a total pore volume, measured on the dried resin by mercury intrusion porosimetry, of at least 0.1 cm$^3$/g, particularly preferably at least 0.5 cm$^3$/g.

The reaction of the aminomethylated bead polymer with vinylsulfonic acid and subsequent alkylation form methyleneaminoethylsulfonic acid structures of the general formula (I):

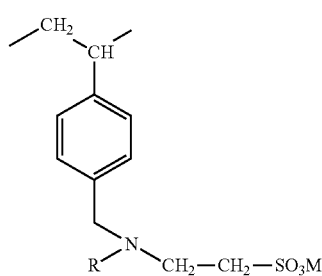

where
R is —H, —$C_1$-$C_6$-alkyl, —$CH_2$—COOM or —$CH_2$—$CH_2$—$SO_3$M and
M is H or a metallic cation, preferably a cation of the alkali metal group, in particular Na$^+$ or K$^+$
in the bead polymer.

The present invention therefore also provides methyleneaminoethyl group-containing chelating resins which are based on at least one aromatic monomer and contain methyleneaminoethyl groups of the formula (I) and have an average particle diameter D in the range from 100 to 1200 µm.

Surprisingly, heavy metals and metals of value can be isolated effectively from aqueous solutions at pH values of <4 by means of the chelating resins of the invention.

The present invention therefore provides for the use of the chelating resins of the invention for removing heavy metals from aqueous solutions having a pH of <4, preferably from aqueous solutions having a pH of from 0 to 4.

Heavy metals and metals of value have, for the purposes of the present invention, been defined at the outset. Aqueous solutions of this type are preferably process water in or from the electronics industry, the electroplating industry or the mining industry.

By way of clarification, it may be remarked that, for the purposes of the present invention, any combinations of definitions and parameters mentioned, either in general terms or in preferred ranges, are also encompassed.

For the purposes of the present invention, deionized water is characterized by having a conductivity of from 0.1 to 10 µS, with the content of dissolved or undissolved metal ions being not greater than 1 ppm, preferably not greater than 0.5 ppm for Fe, Co, Ni, Mo, Cr, Cu as individual components and not greater than 10 ppm, preferably not greater than 1 ppm, for the total of the metals mentioned.

EXAMPLES

Example 1

Preparation of a Monodisperse Aminomethylated Bead Polymer (According to the Invention—Steps a) to c))

1a) Preparation of a Monodisperse, Macroporous Bead Polymer Based on Styrene, Divinylbenzene and Ethylstyrene 3000 g of deionized water were placed in a 10 l glass reactor and a solution of 10 g of gelatin, 16 g of disodium hydrogenphosphate dodecahydrate and 0.73 g of resorcinol in 320 g of deionized water was added and the contents of the reactor were mixed. The mixture was brought to 25° C. While stirring, a mixture of 3200 g of microencapsulated monomer droplets which had been obtained by spraying (jetting), had a narrow particle size distribution and were composed of 3.6% by weight of divinylbenzene and 0.9% by weight of ethylstyrene (used as commercial isomer mixture of divinylbenzene and ethylstyrene containing 80% of divinylbenzene), 0.5% by weight of dibenzoyl peroxide, 56.2% by weight of styrene and 38.8% by weight of isododecane (industrial isomer mixture having a high proportion of pentamethylheptane) was subsequently added, with the microcapsule comprising a complex coacervate of gelatin and a copolymer of acrylamide and acrylic acid cured by means of formaldehyde, and 3200 g of aqueous phase having a pH of 12 were added. The average particle size of the monomer droplets was 460 µm.

The mixture was polymerized while stirring by increasing the temperature according to a temperature program commencing at 25° C. and ending at 95° C. The mixture was cooled, washed on a 32 µm sieve and subsequently dried at 80° C. under reduced pressure. This gave 1893 g of a spherical polymer having an average particle size of 440 µm, a narrow particle size distribution and a smooth surface.

The polymer was chalky white in appearance and had a bulk density of about 370 g/l.

1b) Preparation of a Monodisperse, Amidomethylated Bead Polymer 2373 g of dichloroethane, 750 g of phthalimide and 505 g of 29.2% strength by weight formalin were placed in a reaction vessel at room temperature. The pH of the suspension was set to 5.5-6 by means of sodium hydroxide solution. The water was subsequently removed by distillation. 51.7 g of sulfuric acid were then introduced. The water formed was removed by distillation. The mixture was cooled. At 30° C., 189 g of 65% strength oleum and subsequently 371.4 g of monodisperse bead polymer from example 1a) were introduced. The suspension was heated to 70° C. and stirred at this temperature for a further 6 hours. The reaction liquor was taken off, deionized water was added and residual amounts of dichloroethane were removed by distillation.

Yield of am idomethylated bead polymer: 2140 ml
Elemental composition determined by analysis:
Carbon: 75.3% by weight;
Hydrogen: 4.9% by weight;
Nitrogen: 5.8% by weight;
Balance: oxygen.

1c) Preparation of a Monodisperse, Aminomethylated Bead Polymer 1019 g of 45% strength by weight sodium hydroxide solution and 406 ml of deionized water were added at room temperature to 2100 ml of amidomethylated bead polymer from 1b). The suspension was heated to 180° C. and stirred at this temperature for 6 hours.

The bead polymer obtained was washed with deionized water.

Yield of aminomethylated bead polymer: 1770 ml
The total yield over steps 1b and 1c was, scaled up, 1804 ml
Elemental composition determined by analysis:
Nitrogen: 10.90% by weight
Dry weight: 0.27 g/ml of resin.
Amount of aminomethyl groups in mol per liter of aminomethylated bead polymer: 2.29.

From the elemental composition determined by analysis of the aminomethylated bead polymer, it can be calculated that on statistical average per aromatic ring originating from the styrene and divinylbenzene units, 1.06 hydrogen atoms have been replaced by aminomethyl groups.

Example 2

Preparation of a Macroporous, Monodisperse Chelating Resin Containing Methyleneaminoethylsulfonic Acid Groups (According to the Invention—Steps d) and e))

1600 ml of the water-moist, monodisperse, macroporous aminomethylated resin from example 1 were placed together with 800 ml of deionized water and 1906.75 g of a 25% strength by weight solution of sodium vinylsulfonate in a reaction vessel, heated to reflux and maintained under reflux for 67 hours.

The suspension was then cooled to room temperature.

The resin was washed on a sieve with deionized water, transferred to a column, eluted with 14 liters of 4% strength by weight sodium hydroxide solution and subsequently washed with 42 titers of deionized water.

This gave 2570 ml of a water-moist, monodisperse, macroporous chelating resin having methyleneaminoethylsulfonic acid groups. The resin had a dry weight of 0.29 g per milliliter of resin, a nitrogen content of 5.9% by weight and a sulfur content of 11.6% by weight.

Example 3

Preparation of a Macroporous, Monodisperse, Chelating Resin Containing Methyleneaminoethylsulfonic Acid Groups (According to the Invention—Steps d) and e))

1600 ml of a water-moist, monodisperse, macroporous aminomethylated resin having 2.29 mol of amine per liter of resin and prepared by a method analogous to example 1 were placed together with 800 ml of deionized water and 2288.1 g of a 25% strength by weight solution of sodium vinylsulfonate in a reaction vessel, heated to reflux and maintained under reflux for 67 hours.

The suspension was then cooled to room temperature.

The resin was washed on a sieve with deionized water, transferred to a column, eluted with 14 liters of 4% strength by weight sodium hydroxide solution and subsequently washed with 42 liters of deionized water.

This gave 2750 ml of a water-moist, monodisperse, macroporous chelating resin having methyleneaminoethylsulfonic acid groups. The resin had a dry weight of 0.30 g per milliliter of resin, a nitrogen content of 5.5% by weight and a sulfur content of 12.5% by weight.

Example 4

Preparation of a Macroporous, Monodisperse Chelating Resin Containing Methyleneaminoethylsulfonic Acid Groups and Having Additional Acetic Acid Groups (According to the Invention—Steps f) and g))

700 ml of the water-moist, monodisperse, macroporous chelating resin containing methyleneaminoethylsulfonic acid groups from example 2 were placed together with 737 ml of deionized water in a reaction vessel and heated to 90° C.

177.4 g of an 80% strength by weight solution of chloroacetic acid were then added at 90° C. over a period of 4 hours, with the pH being maintained at a value of 9.2 by addition of 50% strength by weight sodium hydroxide solution over the entire addition time.

After the end of the addition, the temperature was increased to 95° C. and the pH was brought to 10.5 by means of 50% strength by weight sodium hydroxide solution. The mixture was stirred at 95° C. for another 6 hours.

The suspension was then cooled to room temperature.

The resin was transferred to a column and washed with 36 liters of deionized water.

This gave 850 ml of a water-moist, monodisperse, macroporous chelating resin having methyleneaminoethylsulfonic acid groups and additional acetic acid groups. The resin had a dry weight of 0.30 g per milliliter of resin, a nitrogen content of 4.6% by weight and a total capacity of 1.51 eq/l.

Example 5

Reaction of a Macroporous, Monodisperse, Aminomethylated Resin with Sodium Vinylphosphonate (not According to the Invention)

1200 ml of a water-moist, monodisperse, macroporous aminomethylated resin having 2.29 mol of amine per liter of resin and prepared by a method analogous to example 1 were placed together with 600 ml of deionized water and 1451.2 g of a 35% strength by weight solution of monosodium vinylphosphonate in a reaction vessel, heated to reflux and maintained under reflux for 48 hours.

The suspension was then cooled to room temperature.

The resin was washed on a sieve with deionized water, transferred to a column, eluted with 8 liters of 4% strength by weight sodium hydroxide solution and subsequently washed with 40 liters of deionized water.

This gave 1385 ml of a water-moist, monodisperse, macroporous resin. The resin had a dry weight of 0.26 g per milliliter of resin, a nitrogen content of 9.6% by weight and a phosphorus content of 1.5% by weight.

The low phosphorus content indicates a low degree of conversion.

Example 6

Determination of the Copper Capacity of the Resins

Each resin for examination was treated as follows:
50 ml of resin were transferred to a 250 ml screw-cap bottle. The resin was sucked dry by means of a sieve tube and 200 ml of a copper sulfate solution produced from 100 g of copper sulfate pentahydrate in 1 liter of deionized water were added. The tightly closed bottle was shaken at 100 rpm on a shaking machine for 1 hour.

The pH was then checked and if necessary adjusted to a value in the range from 3 to 4 by addition of 25% strength sulfuric acid. The bottle was then shaken at 100 rpm for a further 15 hours. After the resin had settled, a sample of the supernatant liquid was taken for analysis.

The copper concentration of the copper sulfate solution used and of the supernatant liquid at the end of the test are determined by means of atomic absorption spectroscopy.

The amount of copper absorbed per liter of resin is calculated from the difference between the copper content of the copper sulfate solution and the copper content of the supernatant liquid. This amount of copper absorbed per liter of resin is referred to as the copper capacity of the resin.

The results of the measurements on a resin according to the invention and a commercially available IDE chelating resin are shown in table 1:

TABLE 1

Copper capacity of the chelating resins containing methyleneaminoethylsulfonic acid groups from examples 3 and 4

| Sample | Copper capacity (eq/l) | Copper capacity (g/l) | % absorption of available copper |
|---|---|---|---|
| Example 3 | 2.15 | 68.3 | 74 |
| Lewatit ® Monoplus TP 208 | 2.03 | 64.4 | 57 |

It can be seen from table 1, example 3, that the resins of the invention effectively absorb the metal of value copper in acidic solution.

Comparison of example 3 with the IDE resin Lewatit® Monoplus TP 208 shows that the resins of the invention absorb copper significantly better than the commercially available resins at a low pH.

Analysis
Determination of the Total Capacity of the Resins

In a glass filter tube, 100 ml of chelating resin which has been tapped in under deionized water are eluted with 750 ml of 3% strength by weight hydrochloric acid. The resin is subsequently washed with deionized water until the washings are neutral and free of chloride.

0.1 mol/l of sodium hydroxide solution is then passed at 3 ml/minute through 50 ml of the chelating resin which has been converted into the acid form in the glass filter tube.

The eluate is in each case collected in a 250 ml volumetric flask and the total amount is titrated with 1 mol/l of hydrochloric acid against methyl orange. 0.1 mol/l of sodium hydroxide solution is introduced until 250 ml of the eluate have a consumption of 1 mol/l of hydrochloric acid of 24.5-25 ml. The amounts taken off in each case and the titration results are noted.

The total capacity of the resin is calculated according to the following formula:

$$\frac{(x \cdot 25 - V) - 3}{50} = TC \text{ in meq/ml of chelating resin}$$

x=number of eluate fractions

V=total consumption in ml of 1 mol/l hydrochloric acid in the titration of the eluates
3=deduction for residual alkali in the exchanger

The invention claimed is:
1. A chelating resin comprising particles of a polymer containing methyleneaminoethylsulfonic acid groups of the general formula (I)

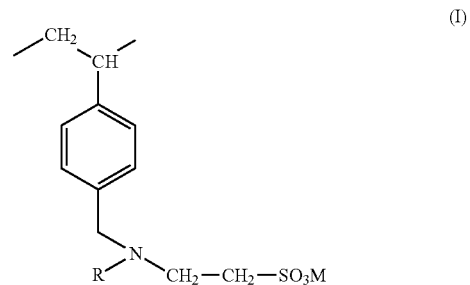

where
R is a radical selected from the group consisting of —H, —$C_1$-$C_6$-alkyl, —$CH_2$—COOM, or —$CH_2$—$CH_2$—$SO_2$M, and
M is H or a metallic cation, and
the particles of the polymer have an average particle size D of 100 μm to 1200 μm.

2. The chelating main as claimed in claim 1, wherein the particles have a monodisperse particle size distribution wherein at least 75% of the particles by volume have a particle size of 0.9 D to 1.1 D.

3. The chelating resin as claimed in claim 2, the average particle size D is a 50% value of a volume-based particle size distribution.

4. The chelating resin as claimed in claim 2, wherein the particles have a macroporous structure.

5. A process for preparing chelating resins containing particles of polymers containing methyleneaminoethylsulfonic acid groups of the general formula (I)

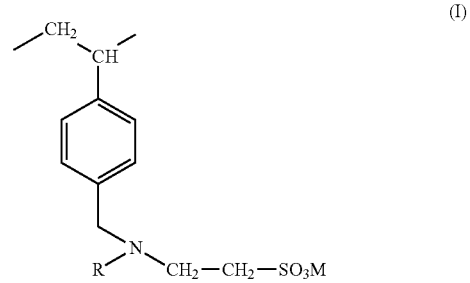

where
R is a radical from the group consisting of —H, —$C_1$-$C_6$-alkyl, —$CH_2$—COOM or —$CH_2$—$CH_2$—$SO_3$M, and
M is H or a metallic cation,
wherein the particles of the polymer have an average particle size D of 100 μm to 1200 μm, and the process compromises:
a) polymerizing a monoethylenically unsaturated aromatic monomer and a multiethylenically unsaturated compound to give polymer particles,
b) converting the polymer particles into aminomethylated polymer particles, c) washing the aminomethylated polymer particles until neutral,
d) reacting the aminomethylated polymer particles with vinylsulfonic acid to produce particles of polymers containing methyleneaminoethylsulfonic acid groups, and
e) washing the particles with deionized water at temperatures of 20 to 120° C. and isolating the particles by allowing the particles to settle or by filtration.

6. The process for preparing chelating resins as claimed in claim 5, wherein the vinylsulfonic acid comprises an alkali metal salt of vinylsulfonic acid.

7. The process for preparing chelating resins as claimed in claim 5, further comprising conducting the polymerization in step a) in the presence of an organic diluent as a pore former.

8. The process for preparing chelating resins as claimed in claim 5, further comprising conducting the polymerization in step a) by the seed feed process or the spraying process in order to produce a monodisperse particle size distribution.

9. The process for preparing chelating resins as claimed in claim 5, further comprising:
f) reacting the chelating resin particles obtained in step e) with an alkylating reagent, and
g) washing the particles with deionized water at temperatures of 20 to 120° C. and isolating the particles by allowing the particles to settle or by filtration.

10. A method of using the chelating resins as claimed in claim 1, the method comprising:
adjusting a pH of aqueous solutions containing heavy metals and/or noble metals to a pH<4 if the pH is not already <4; and
mixing the chelating resins with the aqueous solutions for the selective separation of the heavy metals or the noble metals from the aqueous solutions having a pH of <4.

11. The use method as claimed in claim 10, wherein the aqueous solutions are process water in or from the electronics industry, the electroplating industry or the mining industry.

12. The chelating resin of claim 1, wherein the metallic cation comprises a cation of the alkali metal group.

13. The chelating resin of claim 12, wherein the metallic cation comprises Na+ or K+.

14. A chelating resin comprising macroporous particles of a polymer containing methyleneaminoethylsulfonic acid groups of the general formula (I)

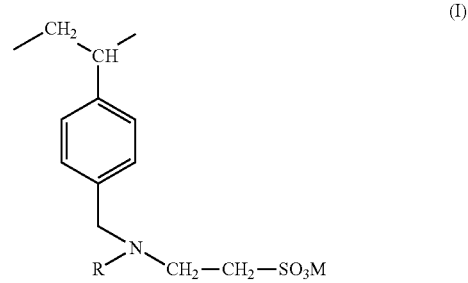

(I)

where
R is a radical from the group consisting of —H, —$C_1$-$C_6$-alkyl, —$CH_2$—COOM, or —CH2-CH2-SO2M; and
M is H or a metallic cation.

15. The chelating resin of claim 14, wherein the particles of the polymer have an average particle size D of 100 μm to 1200 μm.

16. The chelating resin of claim 14, wherein the metallic cation comprises a cation of the alkali metal group.

17. The chelating resin of claim 14, wherein the metallic cation comprises Na+ or K+.

* * * * *